United States Patent [19]

Landoni et al.

[11] 4,336,182

[45] Jun. 22, 1982

[54] SELF-EXTINGUISHING POLYMERIC COMPOSITIONS

[75] Inventors: Gianluigi Landoni; Spartaco Fontani; Osvaldo Cicchetti, all of Milan, Italy

[73] Assignee: Montedison S.p.A., Milan, Italy

[21] Appl. No.: 172,295

[22] Filed: Jul. 25, 1980

[30] Foreign Application Priority Data

Jul. 27, 1979 [IT] Italy ............................. 24732 A/79

[51] Int. Cl.$^3$ .......................... C08K 3/32; C08L 79/04
[52] U.S. Cl. ................................... 524/416; 525/186; 528/370; 528/423; 524/612; 524/589; 524/606; 524/100; 524/105; 524/106; 524/502; 524/514
[58] Field of Search ............... 260/45.8 NH, 45.9 NP; 525/186; 528/73, 343, 370, 423; 544/357; 548/318

[56] References Cited

U.S. PATENT DOCUMENTS

| | | | |
|---|---|---|---|
| 3,004,002 | 10/1961 | Kaplan et al. ................ | 548/318 |
| 3,143,527 | 8/1964 | Wittbecker ................... | 528/343 |
| 3,363,030 | 1/1968 | Cantatore ..................... | 525/186 |
| 3,954,770 | 5/1976 | Mayerhoefer et al. .... | 260/45.8 NH |
| 4,115,351 | 9/1978 | Joh ............................. | 260/45.9 NP |
| 4,165,424 | 8/1979 | Hermans ..................... | 528/423 |
| 4,193,945 | 3/1980 | Bertelli et al. ............. | 260/45.9 NP |
| 4,198,493 | 4/1980 | Marciandi .................. | 260/45.8 NT |

*Primary Examiner*—John Kight, III
*Assistant Examiner*—R. A. White

[57] ABSTRACT

Thermoplastic polymers, such as polypropylene, are rendered anti-flaming and self-extinguishing by addition of ammonium or amine phosphate and a nitrogen-containing water-insoluble oligomer or polymer containing in the monomeric unit a —CO—group attached to a

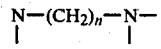

group, wherein n is 2 or 3, being part of a ring, e.g., poly(carbonylpiperazine).

11 Claims, No Drawings

SELF-EXTINGUISHING POLYMERIC COMPOSITIONS

BACKGROUND OF THE INVENTION

Different processes are known in the art for reducing or eliminating the combustibility of thermoplastic polymers. Some of these processes are based on the use of metal compounds, especially antimony, bismuth or arsenic compounds, in combination with partially halogenated and thermally unstable organic compounds, such as, for instance, chlorinated paraffin waxes.

Other, more recent processes are based on the use of organic or inorganic phosphorus compounds in combination with nitrogen-containing organic compounds, in general a resin obtained by condensation of urea, melamine or dicyandiamide with formaldehyde.

These latter retarding systems confer to the polymer that contains them the property of giving place to the formation of a carbonaceous residue following a fire or attack by flame.

The retarding systems of this kind offer several advantages: absence of corrosion phenomena in the machinery on which the polymers are processed; a lower specific weight of the polymeric compositions in comparison with those containing metal compounds and halogenated hydrocarbons, and, above all, the possibility of conferring to the polymers satisfactory anti-flame properties with a lesser quantity of total additive and, thus, without an excessive decay of the mechanical properties of the polymers themselves.

THE PRESENT INVENTION

One object of this invention is to provide new and improved anti-flaming compositions comprising thermoplastic polymers and which have advantages over the prior art anti-flaming compositions.

Another object is to provide anti-flaming compositions comprising thermoplastic resins and which have the specific advantage that, in case of fire, they give off very restrained and non-obscuring smoke emissions.

These and other objects are achieved in accordance with the invention by providing compositions containing, in addition to the thermoplastic polymers, and per 100 parts by weight of the total composition, (1) from 10 to 20 parts by weight of an ammonium or amine phosphate; and (2) from 5 to 8 parts b.w. of a nitrogen-containing compound consisting of a water-insoluble oligomer or polymer containing in the monomeric unit a —CO— group attached to a

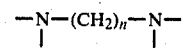

group, wherein n is equal to 2 or 3, being part of a ring.

Among the various usable phosphates are preferred the ammonium polyphosphates comprised in the general formula: $(NH_4)_{n+2}P_nO_{3n+1}$ wherein n represents an integer equal to or greater than 2. The molecular weight of the polyphosphates should preferably be sufficiently high so as to ensure a low solubility in water.

The composition of the polyphosphates of the above indicated formula, in which n is a sufficiently high number, is practically that which corresponds to the formula of the metaphosphates $(NH_4PO_3)_n$.

An example of such polyphosphates is the one marketed under the trademark "Exolit 263" (produced and sold by Benckiser Knapsack GmbH) which has the composition $(NH_4PO_3)_n$ in which n is greater than 50. Still another example is the product marketed under the trademark "Phos-Check P/30" (by Monsanto Chemical Co.) and which has an analogous composition.

Other usable phosphates are those derived from amines, such as, for instance, dimethylammonium phosphate or diethylammonium phosphate, ethylenediamine phosphate or melamine pyrophosphate.

Examples of usable nitrogen-containing compounds are the products obtained by reacting, at a molar ratio 1:1, the compounds reported in the following Table I (columns 2 and 3), wherein is also indicated the probable structure of said products.

Such compounds may be prepared according to methods known in the chemical literature. Methods for their preparation are described following Table I.

TABLE I

| NO. | 1st REACTANT | 2nd REACTANT | PROBABLE STRUCTURE OF THE REACTION PRODUCTS |
|---|---|---|---|
| 1 | Diphenyl carbonate | Piperazine | Poly(carbonylpiperazine) |
| 2 | Diphenyl carbonate | Imidazolidin-2-one | Poly(carbonylimidazolidin-2-one) |
| 3 | Piperazin-N,N'-bis(phenylcarbonate) | Imidazolidin-2-one | Poly(dicarbonylpiperazin-imidazolidin-2-one) |

TABLE I-continued

| NO. | 1st REACTANT | 2nd REACTANT | PROBABLE STRUCTURE OF THE REACTION PRODUCTS |
|---|---|---|---|
| 4 | Isophorondiisocyanate | Piperazine | 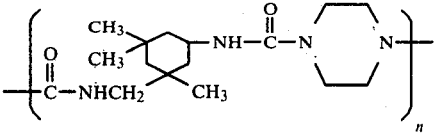<br>Poly(dicarbonyldiaminoisophoron-piperazine) |
| 5 | Diethyl imidodicarbonate | Piperazine | 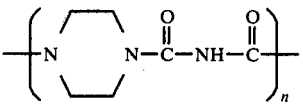<br>Poly(imidodicarbonyl-piperazine) |
| 6 | Diethyl oxalate | Piperazine | 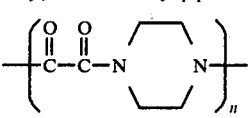<br>Poly(oxalylpiperazine) |
| 7 | Isophorondiisocyanate | 2-Methylpiperazine | 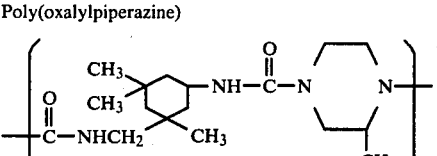<br>Poly(dicarbonyldiaminoisophoron-2-methylpiperazine |

PREPARATION OF POLY(CARBONYLPIPERAZINE)

Into a stainless steel 250 cc autoclave were introduced 112 g (0.52 mol) of diphenyl carbonate and 44.8 g (0.52 mol) of anhydrous piperazine.

After closing the autoclave, the same was heated in an oil bath for about 6 hours at 170°–190° C. After cooling down, the product was discharged and transferred into a 500 cc, two-necked flask, in which it was gradually heated under vacuum up to about 250° C. in order to remove the phenol that had formed during the reaction.

After cooling down, the product was discharged, crushed, washed with water and finally dried under vacuum at 100° C. until it attained a constant weight. Thereby there were obtained 56 g of end product.

PREPARATION OF POLY(CARBONYLIMIDAZOLIDIN-2-ONE)

Into a 1 liter flask fitted with a stirrer, a thermometer, a distilling coolant and a dripping funnel, there were introduced 214.2 g (1 mol) of diphenyl carbonate, 86.1 g (1 mol) of anhydrous imidazolidin-2-one, 300 cc of triisopropylbenzene and 6 g of anhydrous LiOH.

The mass was then gradually heated in an oil bath, under stirring, up to an inside temperature of about 200° C. At 170°–175° C. there distills off the azeotrope tri-isopropylbenzene-phenol which is gathered off while, at the same time, by means of a dripping funnel, there is introduced tri-isopropylbenzene in order to maintain the volume of the reaction mixture constant. The reaction is kept going up to the complete elimination of the phenol. Thereupon the reaction mass is allowed to cool down and the reaction product is then discharged and crushed, washed first with hot water up to neutrality and then with acetone, and finally dried under vacuum at 100° C. until reaching a constant weight. Thereby were obtained 108 g of product.

An analogous product is obtained when, instead of imidazolidin-2-one there is used either hexahydropyrimidin-2-one or 2,3-diketopiperazine.

PREPARATION OF POLY(DICARBONYLPIPERAZIN-IMIDAZOLIDIN-2-ONE)

Into the same flask used for the preceding preparation were introduced 163.2 g (0.5 mol) of piperazin-N,N'-bis (phenylcarbonate), 43 g (0.5 mol) of anhydrous imidazolidin-2-one, 300 cc of anhydrous tri-isopropylbenzene and 3 g of anhydrous LiOH. The procedure was the same as in the preparation of the poly(carbonyl-imidazolin-2-one). Once the developement of phenol had stopped, the mass was allowed to cool down and was then discharged. The reaction product was crushed, washed first with hot water up to neutrality and then with acetone, and finally dried under vacuum at 100° C. up to constant weight. Thereby were obtained 92 g of product.

An analogous product is obtained when, instead of imidazolidin-2-one there is used either hexahydropyrimidin-2-one or 2,3-diketopiperazine.

PREPARATION OF POLY(DICARBONYLDIAMINOISOPHORON-PIPERAZINE)

Into a 1 liter flask fitted with a stirrer, a thermometer, a reflux cooler as well as two dripping funnels, one of the funnels having a heating sleeve, there were introduced 200 cc of acetone, into which, under stirring, there were dripped simultaneously 17.2 g (0.2 mol) of anhydrous piperazine dissolved in 250 cc of acetone and maintained at 50° C., and 44.2 g (0.2 mol) of isophorondiisocyanate (3-isocyanatomethyl-3,5,5-trimethylcyclohexylisocyanate) dissolved in 125 cc of acetone.

From the beginning of the dripping of the two reactants there formed a fine white precipitate; the reaction was exothermic and the temperature maintained itself spontaneously at about 45° C. Once the introduction of the reactants was accomplished, the mixture was allowed to cool down to room temperature and the content of the flask was filtered on a fritted bottom. The cake was then washed with acetone and dried under vacuum at 100° C. to constant weight. There were obtained 59.3 g of product.

PREPARATION OF POLY(IMIDODICARBONYL-PIPERAZINE)

In a 100 cc flask there were made to react at atmospheric pressure and at 140° C., 8 g (0.05 mol) of diethylester of imidodicarbonic acid with 4.3 g (0.05 mol) of anhydrous piperazine; the reaction was conducted under stirring for 1 hour. After this period, the reaction was carried on at the same temperature but at reduced pressure (20 mmHg of residual pressure) for a further hour, and subsequently for another hour at 160° C., still at reduced pressure in order to remove the last traces of the ethanol that had formed during the reaction.

Thereby were obtained 8 g of poly(imidodicarbonyl-piperazine) in the form of a very brittle white product.

PREPARATION OF POLY(OXALYLPIPERAZINE)

Into a 1 liter flask, fitted with a stirrer, a thermometer and a Liebig type coolant, and heated in an oil bath, there were introduced 210.2 g (1.438 mols) of diethyl oxalate and 123 g (1.438 mols) of anhydrous piperazine; it was slowly heated under stirring and at 60° C. there occurred the complete dissolution of the two reactants. The reaction was slightly exothermic and at 85° C. (inner temperature) there set in the distillation of ethanol, while there appeared a white precipitate which continuously grew until at 115° C. (inner temperature) the mass was no longer stirrable. It was heated further for another hour while maintaining the oil bath at 150° C. until distillation of ethanol was completed.

In order to complete the reaction, the solid product was heated at a reduced pressure first at 150° C. and then at 200° C.: thereby were obtained 127.5 g of product.

PREPARATION OF POLY(DICARBONYLDIAMINOISOPHORON-2-METHYL-PIPERAZINE)

Into a 1 liter flask, fitted with a stirrer, a thermometer, a reflux cooler and two dripping funnels of 250 cc holding capacity each, there were introduced 200 cc of acetone and then there were simultaneously dripped in 250 cc of an acetone solution of 20.1 g (0.2 mol) of 2-methylpiperazine and 250 cc of an acetone solution of 44.5 g (0.2 mol) of isophorondiisocyanate(3-isocyanatomethyl-3,5,5-trimethylcyclohexylisocyanate).

The introduction lasted 30 minutes, while the temperature rose from 20° C. to 40° C. Then the mass was reflux-heated for 1 hour, cooled down to room temperature and filtered on a fritted bottom. The cake was washed with acetone and dried under vacuum at 100° C. to constant weight. There were obtained 64 grams of product.

The self-extinguishing compositions of the present invention can be prepared according to known methods: for instance, by first thoroughly mixing together ammonium or amine phosphate with the finely ground nitrogen-containing compound (size of particles from 10 to 75 microns) and the mixture thus obtained is added to the thermoplastic polymer in a turbomixer in order to form a homogeneous mix which is then extruded and granulated. The granular product thus obtained can be transformed into a variety of articles according to any of the known forming methods.

The anti-flame additives of this invention are also useful in anti-fire paints.

For the evaluation of the self-extinguishing properties of the polymeric compositions containing the anti-flame additives, one may proceed as follows: with the granular product there are molded small plates 3 mm thick (⅛ of an inch) in a flat press of the MOORE type, operating for 7 minutes at a pressure of 40 kg/cm$^2$ and at a suitable temperature.

On the small plates thus obtained it is possible to determine the level of self-extinguishing properties by measuring the oxygen index (according to ASTM D-2863 standards) in a Stanto Redcroft apparatus, or by applying the UL-94 rules (published by "Underwriters Laboratories", USA) which supply an evaluaation of the degree of self-extinguishing properties of the plastic materials.

In Examples 1-11, tabulated in Table II, there are reported both the oxygen index values and those for the "Vertical Burning Test" which allows to classify the material at three levels 94 V-0, 94 V-1 and 94 V-2 which indicate, in a decreasing order, the degree of uninflammability.

As a thermoplastic polymer there was used an isotactic polypropylene in flakes, having a Melt Flow Index equal to 12.

TABLE II

| SELF-EXTINGUISHING COMPOSITIONS BASED ON POLYPROPYLENE | | | | | | | | | | | |
|---|---|---|---|---|---|---|---|---|---|---|---|
| | PARTS BY WEIGHT | | | | | | | | | | |
| COMPONENTS | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Polypropylene | 78 | 81 | 78 | 78 | 75 | 78 | 78 | 78 | 78 | 78 | 78 |
| Antioxidant* | 1 | 1 | 1 | 1 | 1 | 1 | 1 | 1 | 1 | 1 | 1 |
| Ammonium polyphosphate ("Exolit 263") | 14 | 12.46 | 15 | 15.40 | 18 | 15 | 15 | 15 | 15 | 15 | 15 |
| Poly(carbonylpiperazine) | 7 | 5.54 | 6 | 5.60 | 6 | | | | | | |
| Poly(carbonylimidazolidin-2-one) | | | | | | 6 | | | | | |
| Poly(dicarbonylpiperazin-imidazolidin-2-one) | | | | | | | 6 | | | | |
| Poly(dicarbonyldiaminoisophoron-piperazine) | | | | | | | | | 6 | | |
| Poly(imidodicarbonyl-piperazine) | | | | | | | | | | | 6 |

TABLE II-continued
SELF-EXTINGUISHING COMPOSITIONS BASED ON POLYPROPYLENE

| COMPONENTS | PARTS BY WEIGHT | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Poly(oxalylpiperazine) | | | | | | | | | | 6 | |
| Poly(dicarbonyldiamino-isophoron-2-methyl piperazine) | | | | | | | | | | | 6 |
| Oxygen index | 28.6 | 26.7 | 30.8 | 28.6 | 30 | 29 | 30 | 27.8 | 27.2 | 27 | 27.7 |
| Ul-94 (⅛ inch) | V-2 | — | V-0 | V-0 | V-0 | V-0 | V-0 | — | — | — | — |

*Mixture of 6 parts of dilauryl thiodipropionate and 4 parts of pentaerythritol tetra [3-(3.5-di-t-butyl-4-hydroxyphenyl)-propionate]

What is claimed is:

1. Self-extinguishing polymeric compositions based on a thermoplastic polymer, and comprising for 100 parts by weight of the total composition:
   (1) from 10 to 20 parts by weight of a compound selected from the group consisting of amine phosphates, ammonium phosphates and ammonium polyphosphates; and
   (2) from 5 to 8 parts by weight of a nitrogen-containing product consisting of an oligomer or a polymer, insoluble in water, containing in the monomeric unit a —CO— group attached to the nitrogen atom of a ring selected from the piperazine and imidazolidin-2-one rings.

2. Polymeric compositions according to claim 1, in which the ammonium phosphate is a polyphosphate of the composition $(NH_4PO_3)_n$ wherein n is greater than 50.

3. Polymeric compositions according to claim 1, in which the nitrogen-containing product is the product obtained by reacting diphenyl carbonate with piperazine in the molar ratio 1:1.

4. Polymeric compositions according to claim 1, in which the nitrogen-containing product is the product obtained by reacting diphenyl carbonate with imidazolidin-2-one in the molar ratio 1:1.

5. Polymeric compositions according to claim 1, in which the nitrogen-containing product is the product obtained by reacting piperazine-N,N'-bis(phenylcarbonate) with imidazolidin-2-one in the molar ratio 1:1.

6. Polymeric compositions according to claim 1, in which the nitrogen-containing product is the product obtained by reacting 3-isocyanatomethyl-3,5,5-trimethylcyclohexylisocyanate with piperazine in the molar ratio 1:1.

7. Polymeric compositions according to claim 1, in which the nitrogen-containing product is the product obtained by reacting diethyl imidodicarbonate with piperazine in the molar ratio 1:1.

8. Polymeric compositions according to claim 1, in which the nitrogen-containing product is the product obtained by reacting diethyl oxalate with piperazine in the molar ratio 1:1.

9. Polymeric compositions according to claim 1, in which the nitrogen-containing product is the product obtained by reacting 3-isocyanatomethyl-3,5,5-trimethylcyclohexylisocyanate with 2-methylpiperazine in the molar ratio 1:1.

10. Polymeric compositions according to claim 1, in which the thermoplastic polymer is polypropylene.

11. Self-extinguishing polymeric compositions based on thermoplastic polymers, comprising an antiflame additive a component of which is a nitrogen-containing product in the form of an oligomer or a polymer insoluble in water, and in which the repeating monomeric unit contains a —CO— group attached to the nitrogen atom of a ring selected from the piperazine and imidazolidin-2-one rings.

* * * * *